United States Patent

[11] 3,589,561

[72] Inventor Harry Gilbert Davis
P.O. Box 18, Combes, Tex. 78535
[21] Appl. No. 859,674
[22] Filed Sept. 22, 1969
[45] Patented June 29, 1971

[54] APPARATUS FOR MEASURING AND DISPENSING LIQUIDS
2 Claims, 5 Drawing Figs.

[52] U.S. Cl. .................................................. 222/57, 222/358
[51] Int. Cl. .................................................. B67d 5/08
[50] Field of Search .......................................... 222/57, 455

[56] References Cited
UNITED STATES PATENTS
2,091,929  8/1937  Kappenberg ................. 222/455
3,281,015  10/1966  Streb ........................... 222/57

Primary Examiner—Robert B. Reeves
Assistant Examiner—Francis J. Bartuska
Attorney—Ralph Burch ABSTRACT: Apparatus for measuring and dispensing a liquid chemical into a water reservoir including a dipper pipe and measuring pipe connected together in alignment, means for alternately raising and lowering the dipper and measuring pipes in a chemical supply tank so that upon raising the dipper pipe a supply of chemical will be raised by the dipper pipe and dispensing into the measuring pipe, the dipper pipe having means at its inner end extending into the measuring pipe for directing the flow of chemical from the measuring pipe to a discharge pipe when the measuring pipe is raised.

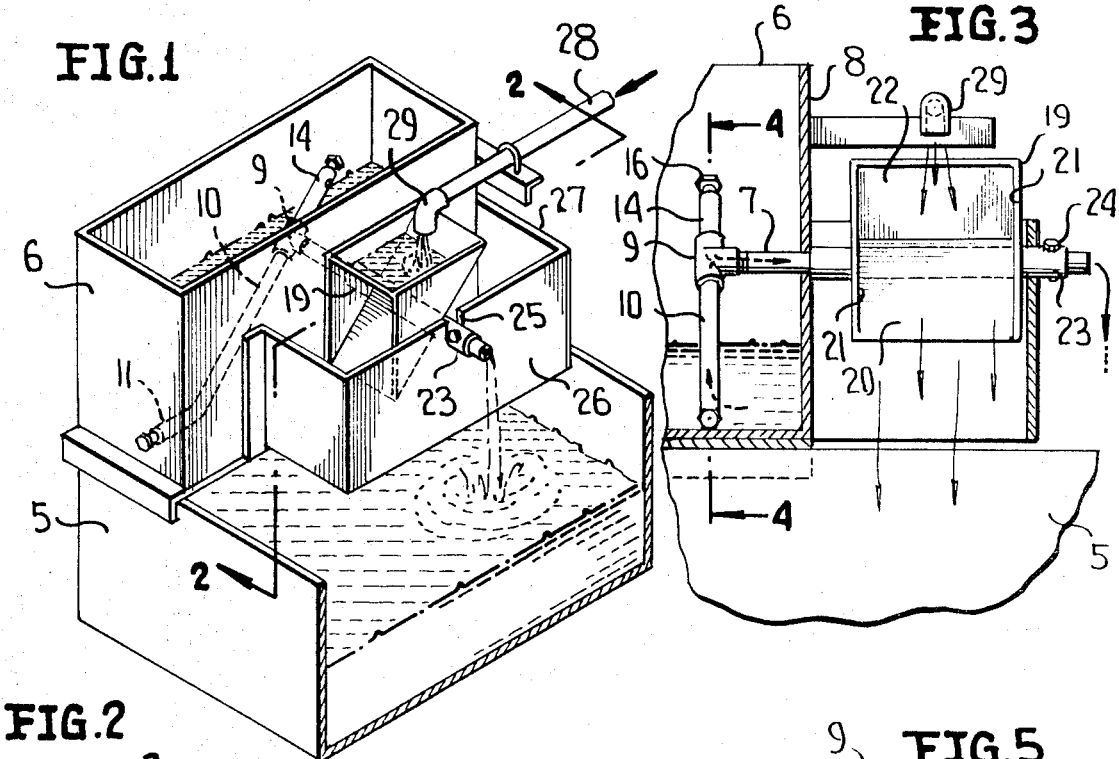
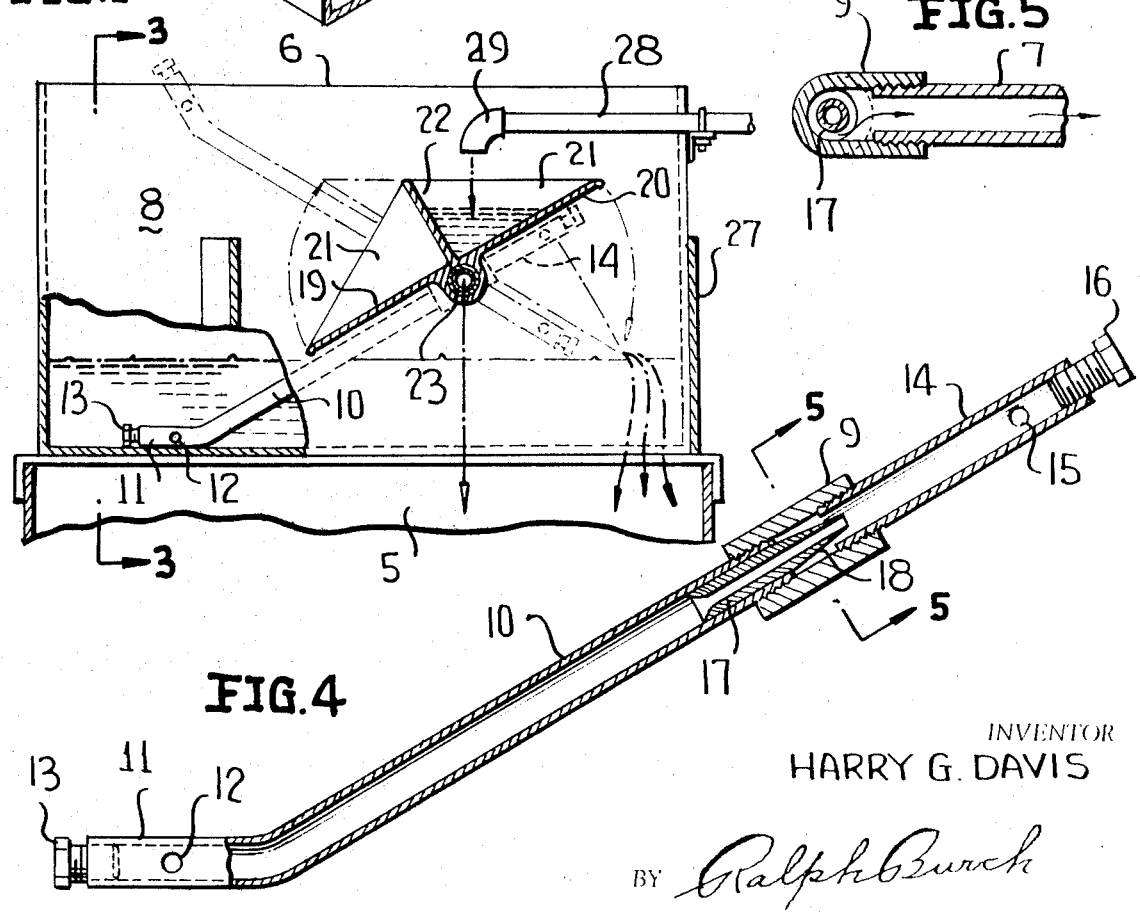

APPARATUS FOR MEASURING AND DISPENSING LIQUIDS

It is an object of the invention to provide apparatus for metering the amount of liquid chemical supplied to livestock-watering tanks including means for collecting a supply of chemical from a supply tank and dispensing it into a measuring chamber with means in the measuring chamber to direct the flow of chemical to a discharge pipe.

A further object of the invention resides in apparatus for supplying a metered amount of liquid chemical including a dipper pipe rockably mounted in the chemical supply tank, one end of the pipe serving to collect a supply of chemical and the other end serving to measure the supply of chemical to be dispensed and having means therein to direct the flow of chemical to a discharge pipe.

Other objects and advantages of the invention will be apparent during the course of the following description.

In the accompanying drawing forming a part of this specification:

FIG. 1 is a perspective view of the apparatus applied to a water supply tank,

FIG. 2 is a sectional view taken on line 2–2 of FIG. 1,

FIG. 3 is a sectional view taken on line 3–3 of FIG. 2,

FIG. 4 is a sectional view taken on line 4–4 of FIG. 3, and,

FIG. 5 is a sectional view taken on line 5–5 of FIG. 4.

Referring to the drawing, the apparatus is shown in FIG. 1 applied to a tank 5 for holding drinking water for livestock. The tank may be rectangular shape and spanning the top of the tank, at one end, is a rectangular reservoir 6 for holding a liquid chemical, such as phosphoric acid. A pipe 7 is journaled in the sidewall 8 of the reservoir 6 and attached to the end of the pipe inside the reservoir is a tee couplings 9. Attached to one branch of the tee coupling is a dipper pipe 10 having its free end 11 bent at an angle with an opening 12 in the side thereof which allows the chemical to flow into the pipe. The free end of the dipper pipe is provided with an adjustable plug 13. A measuring pipe 14 is attached to the opposite branch of the tee coupling and near its outer end is provided with opposed openings 15. An adjustable screw plug 16 is mounted in the free end of pipe 14. The end of the dipper pipe fitted in the branch of the tee coupling has a tube 17 fitted in the bore thereof, which extends beyond the end of the dipper pipe into the end of the measuring pipe 14 with its outer wall tapered, as at 18, to direct the flow of liquid from the measuring pipe through the coupling.

The pipe 7 projects beyond the sidewall 8 of the reservoir and supports a tray 19 having a bottom wall 20, sidewalls 21 and a vertical partition 22 intermediate the ends of the sidewalls. A tubular sleeve 23 is fixedly attached to the bottom wall 20 through which the pipe 7 extends and a bolt 24 connects the pipe and sleeve together. The outer end of the sleeve 23 is journaled in a notch 25 formed in the wall 26 of a frame 27 surrounding the tray and attached to the wall 8 of the reservoir 6. A water supply pipe 28 has its discharge nozzle 29 disposed above the center of the tray for dispensing water into the tray on opposite sides of the partition 22 for imparting a rocking motion to the tray whereby the pipe 7 is rotated to move the dipper pipe 10 up and down in the reservoir 6.

In operation, when the dipper arm is disposed in the position shown in FIG. 2, the lower end of the arm is filled with the chemical liquid which enters the pipe through the opening 12. As the water from the supply pipe 28 fills one end of the tray 19, the tray is rocked which rotates pipe 7 and thereby raises the dipper pipe to an elevated position, as shown in dotted lines in FIG. 2. The chemical collected by the dipper pipe flows into the measuring pipe 14 which has an adjustable plug 16 and openings 15 to regulate the amount of liquid retained in the pipe. When the tray is rocked in the opposite direction by the flow of water into the tray, the measuring pipe is raised to an elevated position and as the chemical liquid flows down the pipe it is directed by the tapered end of tube 17 into the pipe 7 and is discharged from the end thereof into the water tank.

Having thus described my invention, I claim:

1. Apparatus of the character described comprising a water reservoir, a chemical supply tank mounted on said reservoir, a rotatable tubular shaft extending through the wall of said tank with the outer end disposed above said water reservoir, a tee coupling attached to the inner end of said rotatable shaft with the aligned branches disposed at right angles to said shaft, a dipper pipe extending from one branch of said coupling having an opening at its free end, a measuring pipe extending from the other branch of said coupling, a tube extending from the inner end of said dipper pipe into the inner end of said measuring pipe, the free end of said tube having its outer wall tapered to provide a passage between said measuring tube and said rotatable shaft and means for rocking said rotatable shaft to alternately raise and lower said dipper and measuring pipes.

2. Apparatus of the character described in claim 1 wherein said means for rocking said rotatable shaft is a tray bridging the outer end of said shaft and fixedly attached thereto, said tray having a partition intermediate its ends and means for discharging water into the ends of said tray.